May 17, 1955 — W. P. SCHMITTER — 2,708,416
MARINE DRIVE
Filed May 31, 1951 — 4 Sheets-Sheet 1

INVENTOR.
Walter P. Schmitter
BY Eugene N. Simpson
Attorney

May 17, 1955  W. P. SCHMITTER  2,708,416
MARINE DRIVE

Filed May 31, 1951  4 Sheets-Sheet 2

INVENTOR.
Walter P. Schmitter
BY Eugene W. Simpson
Attorney

INVENTOR.
Walter P. Schmitter
BY
Eugene W. Simpson
Attorney

May 17, 1955   W. P. SCHMITTER   2,708,416
MARINE DRIVE
Filed May 31, 1951   4 Sheets-Sheet 4
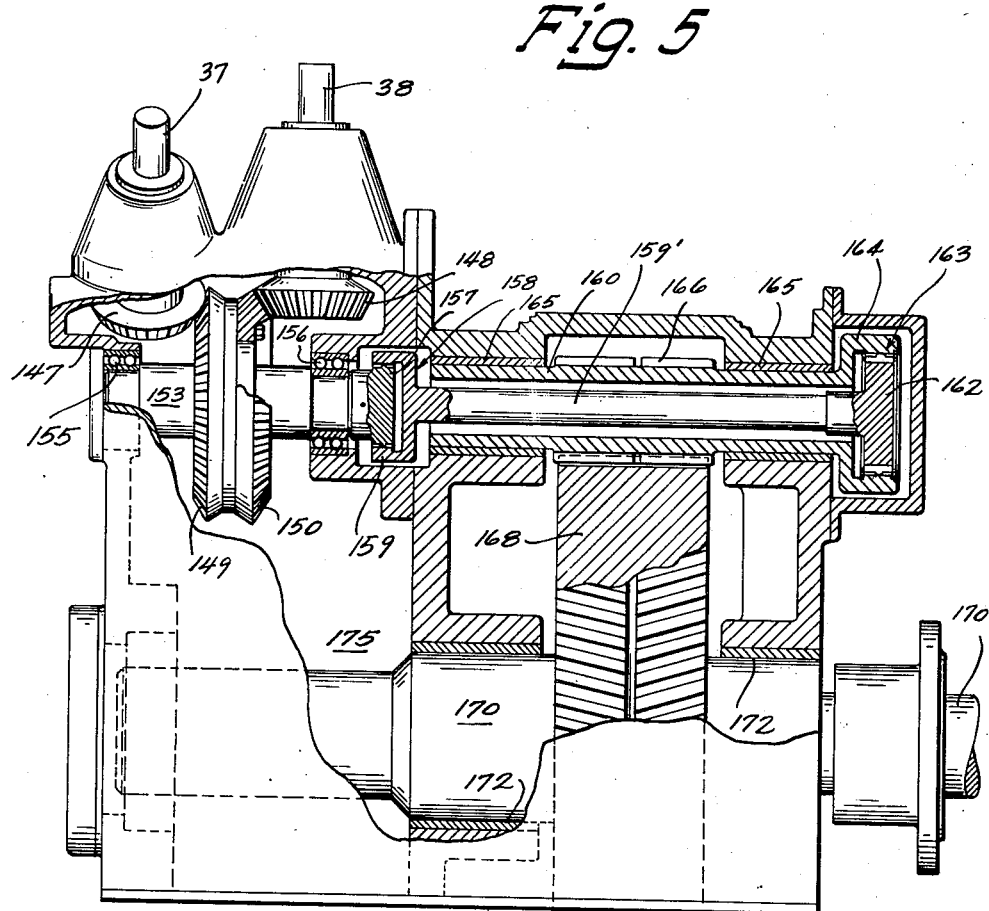
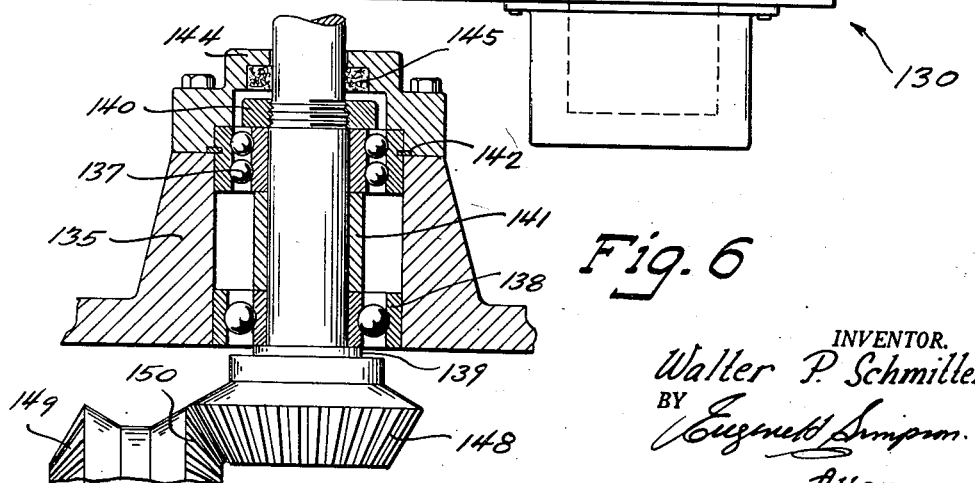
INVENTOR.
Walter P. Schmitter
BY
Attorney

United States Patent Office 2,708,416
Patented May 17, 1955

2,708,416

MARINE DRIVE

Walter P. Schmitter, Wauwatosa, Wis., assignor to The Falk Corporation, Milwaukee, Wis., a corporation of Wisconsin Application May 31, 1951, Serial No. 229,045

11 Claims. (Cl. 115—34)

This invention relates to ship propulsion and more particularly to a multiple engine drive for a ship, or the like.

In marine drives it is highly desirable to use a plurality of smaller engines rather than one large engine. Such an arrangement provides maximum efficiency since any number of engines may be cut out leaving the remainder of the engines to be used to propel the ship, with each of the driving engines working at or near its point of maximum efficiency. The single large engine, on the other hand, would only operate at maximum efficiency under a definite load.

Another advantage of a multiple engine drive is that it adds to safer operation of the ship. Should one or more engines fail the failed engines may be cut out and repaired while the remaining engines continue to propel the ship at reduced speed. This safety feature is particularly advantageous in ships used to transport supplies in warfare, since a single enemy shot could disable a ship completely by hitting its single large engine, leaving the ship at the mercy of either a ship or shore battery. A ship driven by multiple engines, however, could have one or more engines disabled and still move out of range of the battery.

A plurality of engines occupies more floor space than a single larger engine, and therefore cannot be positioned adjacent the propeller tunnel, where the ship is quite narrow, but must be located either high in the fantail or amidships.

Positioning the multiple engines amidships necessitates an excessively long propeller shaft and cuts down on available hold space, occupying space that could be far better used for cargo.

If the multiple engines are positioned in the fantail they then must lie a considerable distance above the propeller tunnel, and any connecting shafts would be subject to the strains induced in the ship due to heavy weather.

It is an object of the present invention to provide a multiple engine drive for a ship, or the like, which will entail a short propeller tunnel.

Another object is to provide a multiple engine drive for a ship, or the like, which will minimize the effect of strains in the ship due to heavy weather.

Another object of the invention is to provide a multiple engine drive of maximum flexibility for a ship, or the like.

A further object of the invention is to provide a drive for a ship, or the like, which will tend to dampen vibration in the ship.

A further object is to provide a drive for a ship, or the like, which will permit continued movement of the ship during repairs to one or more engines.

A further object is to provide a drive for a ship, or the like, which will permit ready replacement of certain driving elements.

A still further object of the invention is to provide a drive for a ship, or the like, which will give maximum security against disabling the ship due to engine breakdown.

A still further object is to provide a multiple engine drive for a ship, or the like, in which the engines are located above the propeller shaft in the fantail.

A still further object is to provide a multiple engine drive for a ship, or the like, having a maximum useable hold space.

A still further object is to provide a multiple engine drive for a ship, or the like, which will be simple to install and economical to manufacture.

A still further object of the invention is to provide a ship's drive which will insure maximum efficiency of operation at all speeds.

Still further objects of the invention will become apparent upon considering the following specification, which, when taken in conjunction with the accompanying drawings, illustrate a preferred form of the invention.

In the drawings:

Fig. 5 is a slightly enlarged longitudinal cross-section through the propeller shaft drive; and Fig. 6 is an enlarged cross-section through the center of the drive shaft for the propeller transmission showing the bearing supports for the drive shaft.

Figure 1:
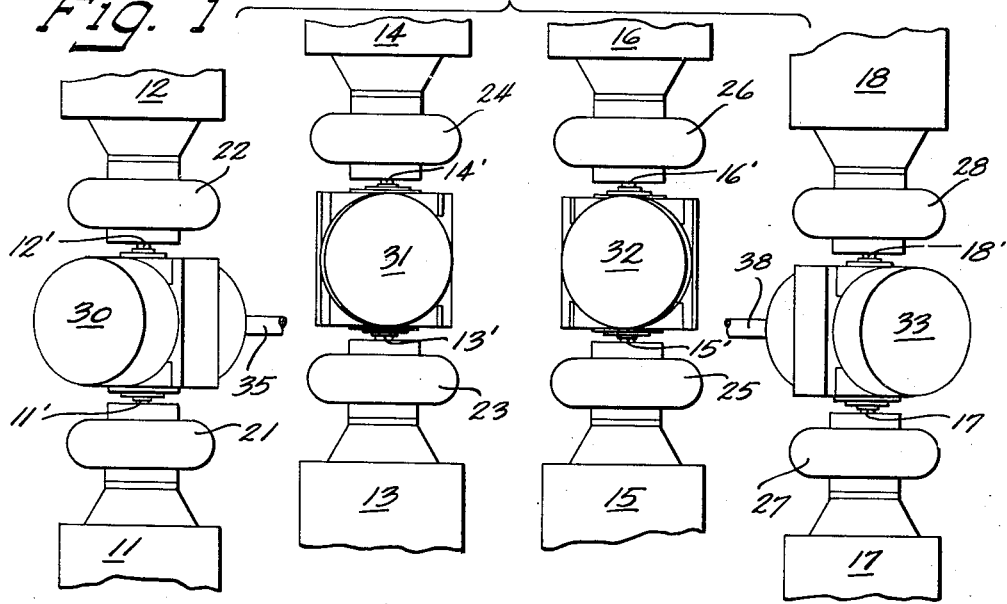
Fig. 1 is a plan view of an eight engine drive for a ship, or the like, incorporating the principles of the present invention.

The drawings show an eight engine drive, although it is to be understood that the principles set forth hereinafter may be adapted to drives involving more or fewer than eight engines.

Referring now to the drawings, the eight engines constituting the present power plant are arranged in four axially alined pairs 11—12, 13—14, 15—16 and 17—18, the drive shafts 11'—12', 13'—14', 15'—16' and 17'—18' of each engine being alined with the drive shaft of the other engine of that pair.

The drive shafts of each pair of engines 11—12, 13—14, 15—16 and 17—18 are connected through hydraulic couplings 21, 22, 23, 24, 25, 26, 27 and 28 to right angle transmissions 30, 31, 32 and 33, respectively, each transmission 30, 31, 32 and 33 receiving the power from the horizontal shaft of two alined engines of a pair and transmitting the power to perpendicular shafts 35, 36, 37 and 38.

Figure 3:
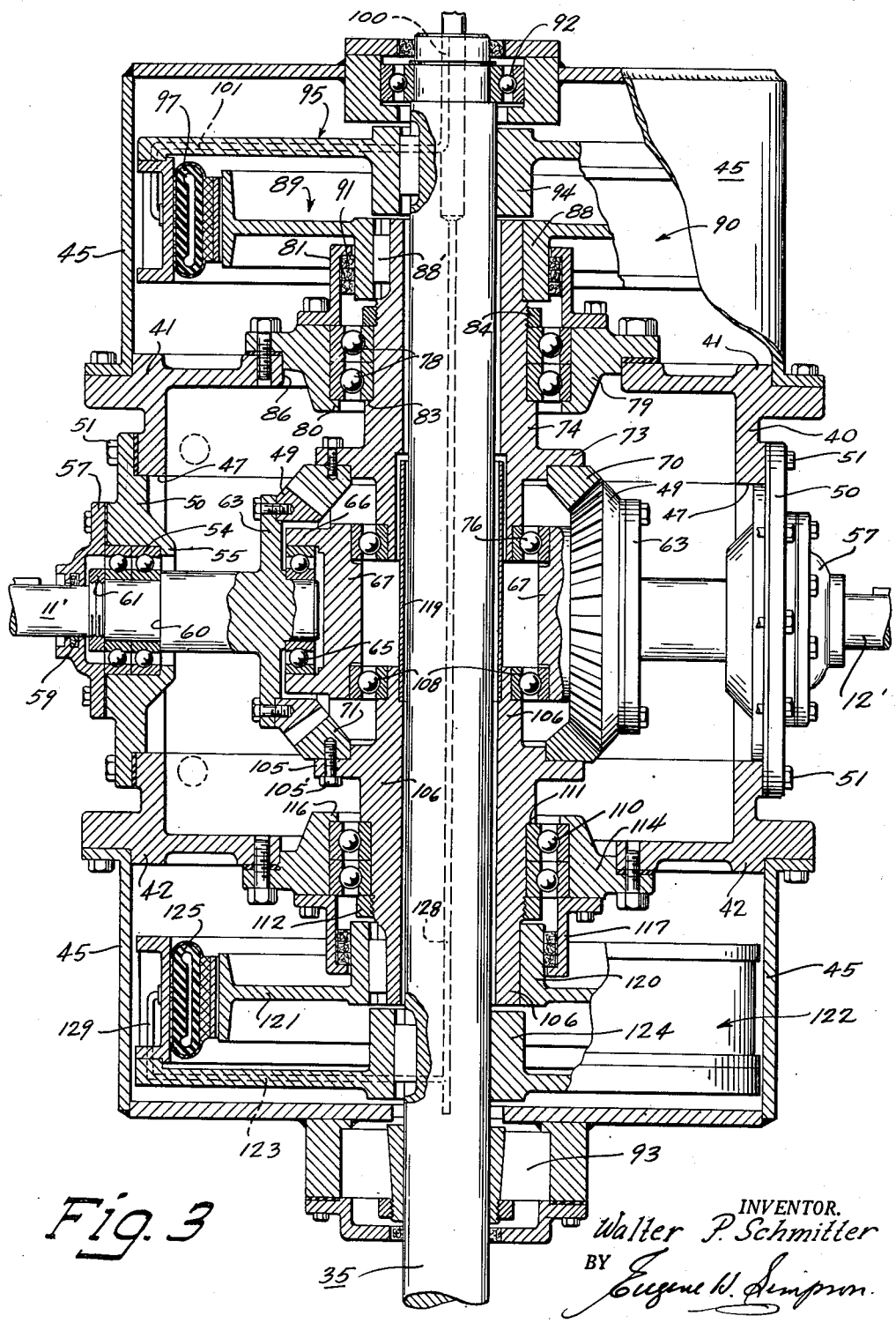
Fig. 3 is a vertical longitudinal cross-section taken through the center of an angle transmission and is a cross-section taken on the line 3—3 of Fig. 2.

Since each of the transmissions 30, 31, 32 and 33 are identical they can be adequately described by referring to the transmission 30, which is shown in detail in Fig. 3.

Referring to Fig. 3 the transmission 30 is built about a square frame 40 which has cylindrical collars 41 and 42 at its upper and lower ends to accommodate cylindrical casings 45—45 which serve as covers for the upper and lower ends of the transmission. The frame 40 contains alined circular openings 47—47 which are of sufficient size to receive bevel gears 49—49. The openings 47—47 are covered by caps 50—50 bolted in place about the periphery of the openings 47 by machine or cap screws 51.

The caps 50—50 contain thrust resisting bearings 54 which are retained in place in the caps between collars 55 and oil seal caps 57. The caps 57 contain oil seal rings 59 which surround the shafts 11' and 12' and prevent leakage of oil from the casing.

The shafts 11' and 12', which are alined, enter the casing 40 through the caps 50 and 57 and are retained rigidly in position in the casing by the bearings 54. The bearings 54 are fixed in axial position on the shafts 11' and 12' between shoulders 60 on the shafts 11' and 12' and ring nuts 61.

The shafts 11' and 12' are provided with face plates 63—63 to which are secured the bevel gears 49 heretofore mentioned. The inner ends of the shafts 11' and 12' extend beyond the face plates 63 and are received in bearings 65 which are held in cup-like recesses 66 in a transverse web 67 in the frame 40.

The bevel gears 49—49 unite to drive a pair of bevel gears 70—71 in opposite directions.

The gear 70 is secured on a face plate 73 on a hollow shaft 74 which projects above the gear 70 and is rotatably supported in the frame 40 between a bearing 76, carried in the upper face of the web 67, and ball bearings 78 carried in a cover plate or cap 79. The outer races of the bearings 78 are held in fixed axial position in the plate 79 between a shoulder 80 in the cap and an oil seal cap 81 bolted on the upper face of the plate 79. Similarly, the inner races of the bearings 78 are held in position between a shoulder 83 on the hollow shaft 74 and a ring nut 84 so that the hollow shaft 74 is held rigidly in fixed axial position in the frame 40, since the ball bearings effectively resist thrust.

The cover plate or cap 79 is received over an opening 86 in the upper end of the frame 40, the opening 86 being of sufficient size to receive the bevel gear 70 during assembly.

The upper end of the hollow shaft 74 carries the hub 88 of the inner element 89 of a pneumatic clutch, generally designated 90. The hub 88 is held on the shaft 74 by a key 88' so that the inner element 89 is driven directly from the shaft 74. Oil is prevented from leaking past the hub 88 by oil seal rings 91 carried by the cap 81.

The drive shaft 35 is received in the interior of and is co-axial with the hollow shaft 74. The shaft 35 is supported between a ball bearing 92 at the upper end of the transmission 30 and an SKF self alining roller bearing 93 at the lower end, the shaft 35 being longitudinally fixed in the transmission but free to rotate therein.

The shaft has keyed thereto a hub 94 of the outer element 95 of the pneumatic clutch 90. The outer element 95 of the clutch 90 carries an expansible pneumatic element 97 which element 97 is adapted to expand to engage the inner element 89 to form a driving connection between the inner and outer elements of the clutch 90.

Pneumatic pressure to operate the clutch is supplied to the expansible element 97 from a source (not shown) through passageway 100 in the shaft and through passageway 101 in the frame of the outer element 95 of the clutch 90.

The bevel gear 71 which is rotated in the opposite direction from the gear 70 by the bevel gears 49—49 is fixed to a face plate 105 by machine or cap screws 105'. The plate 105 is formed intermediate the ends of a hollow shaft 106 which is received over the shaft 35.

The shaft 106 is supported in the frame 40 by a ball bearing 108 in the transverse web 67 at the upper end of the shaft 106 and by a ball bearing 110 near the lower end of the shaft 106. The inner race of the bearing 110 is retained in fixed position on the shaft 106 between a shoulder 111 on the shaft and a ring nut 112. The outer race of the bearing 110 is mounted in a cap 114 which covers an aperture in the frame 40. The outer race of the bearing 110 is held in position between a shoulder 116 in the cap 114 and an oil ring cap 117, bolted or otherwise secured to the cap 114.

The cap 114 covers an aperture in the frame 40 which is of sufficient size to admit the gear 71 to its position in the frame 40.

The upper end of the hollow shaft 106 has a tube 119 sweated therein which surrounds the shaft 35 and extends into the shaft 74 to a point above the gear 70 to form an oil seal for the shaft 35.

The lower end of the shaft 106 carries a hub 120 of the inner element 121 of a second pneumatic clutch, generally designated 122, similar to the clutch 90. The hub 120 is keyed onto the shaft 106 so that rotation of the shaft 106 by the rotation of the gear 71 is transmitted directly to the element 121.

The outer element 123 of the clutch 122 has a hub 124 keyed onto the shaft 35. The outer element 123 carries a pneumatic expansible element 125 which upon application of pneumatic pressure through conduits 128 and 129 expands into engagement with the inner element 121 to form a driving connection.

Figure 2:
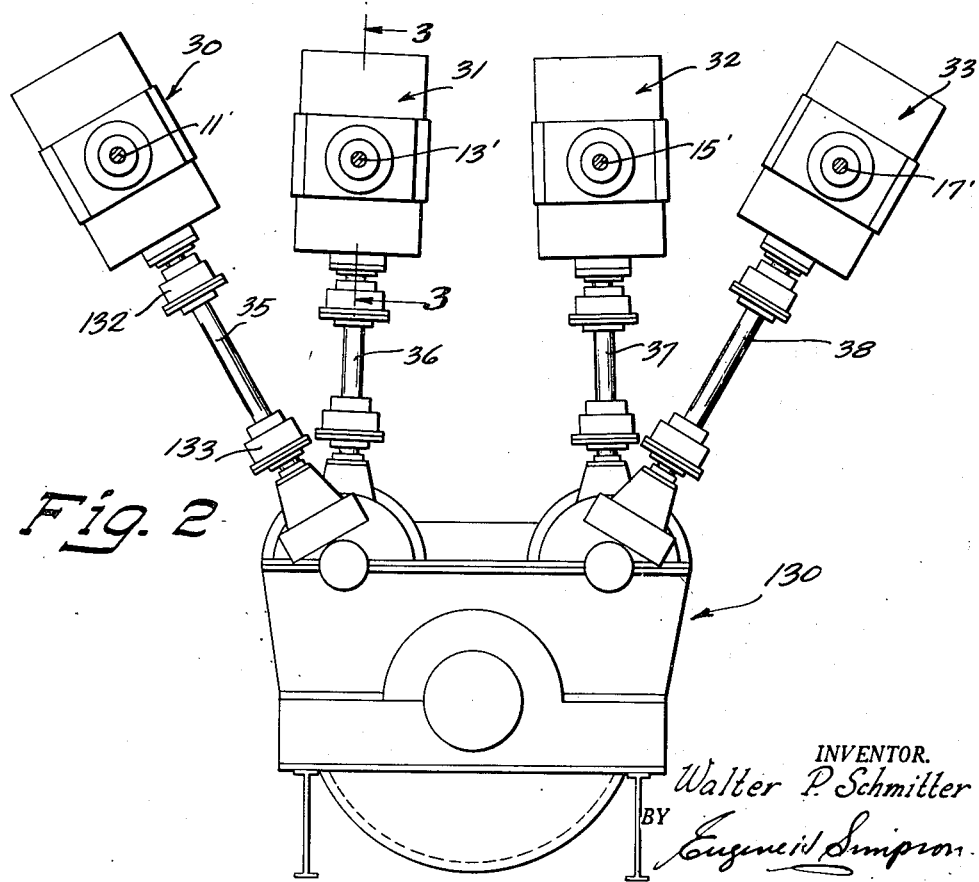
Fig. 2 is an end elevational view of the drive shown in Fig. 1.
Figure 4:
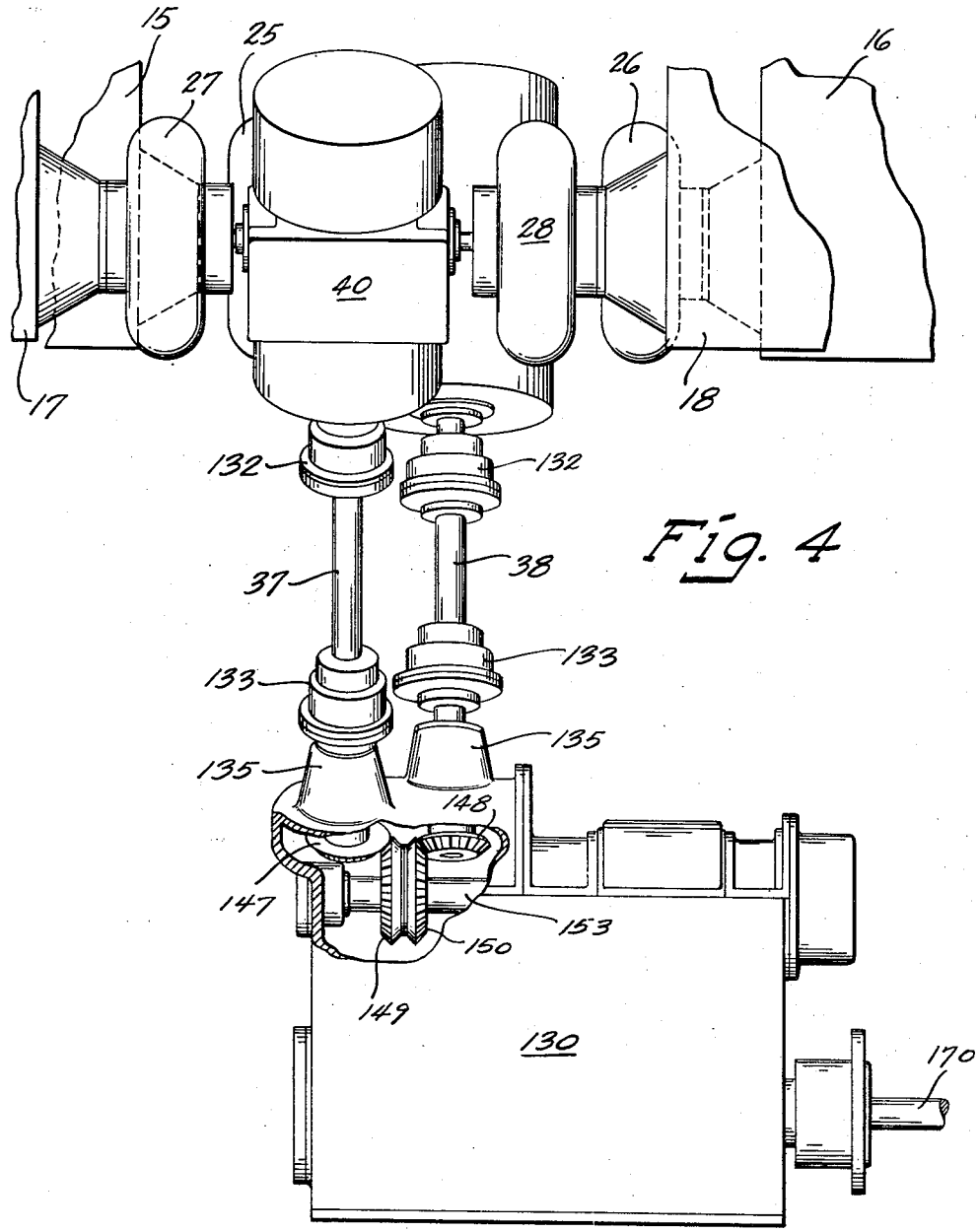
Fig. 4 is a side elevational view of the multiple engine drive, parts being broken away to more clearly illustrate certain other parts.

Referring now to Figs. 2 and 4, the power from the eight engines passes through the four right angle transmissions 30, 31, 32 and 33 and is transmitted to a propeller shaft transmission, generally designated 130, through the shafts 35, 36, 37 and 38. In order to compensate for strains in the ship the shafts 35, 36, 37 and 38 are each provided with a flexible coupling 132 adjacent the right angle transmissions 30, 31, 32 and 33 and a second flexible coupling 133 adjacent the propeller shaft transmission 130. The couplings 132 and 133 are of the type adapted to compensate for misalinement of the shaft, such as the flexible couplings shown in U. S. Patent No. Re. 15,903, to James Bibby, dated August 26, 1924.

From Fig. 2 it will be seen that the shafts 35 and 36 enter the transmission 130 on one side thereof, while the shafts 37 and 38 enter the transmission 130 on the opposite side. Since both sides are identical the construction will be described as it affects shafts 37 and 38, as seen in Figs. 4 and 5, it being understood that an identical structure is provided for shafts 35 and 36.

Referring to Figs. 4 and 5, and particularly to Fig. 5, the shafts 37 and 38 enter the propeller shaft transmission 130 through bearing boxes 135—135. The bearing boxes 135 each contain an upper bearing 137 and a lower bearing 138.

The inner races of the bearings 137 and 138 are secured on the shafts 37 and 38 between a shoulder 139 and a ring nut 140 with a spacer sleeve 141 fitting over the shaft to retain the bearings properly spaced.

The outer race of the bearing 137 is secured in the bearing box 135 by a snap ring 142. The snap rings are held in position in the boxes 135 by cover plates 144. Oil seal rings 145 in the cover plates 144 prevent leakage of oil from the transmission 130.

The shafts 37 and 38 terminate at their lower ends in bevel gears 147 and 148, respectively. The gears 147 and 148 are in mesh with a pair of bevel gears 149 and 150 which are mounted back to back on a stub shaft 153.

The shaft 153 is rotatably supported in the transmission 130 by a pair of ball bearings 155 and 156. The shaft 153 projects beyond the bearing 156 and terminates in the male member 157 of a flexible gear coupling 158. The female member 159 of the coupling 158 is formed on a shaft 159' which projects through a hollow spindle 160 and terminates in the male member 162 of a flexible gear coupling 163. The female member 164 of the coupling 163 is formed on the end of the spindle 160 so that the spindle 160 is driven from the shaft 153 through the two flexible gear couplings 158 and 163.

The spindle 160 is mounted in bearings 165—165 in the transmission 130. The spindle 160 has a spiral or herringbone gear 166 formed on its exterior surface which engages the teeth of a main drive gear 168.

The gear 168 is keyed on the propeller shaft 170 which drives the ship.

The propeller shaft 170 is suitably bearinged in the transmission 130 in bearings 172—172.

A Kingsbury thrust bearing 175 at the inner end of the shaft 170 absorbs the thrust of the propeller (not shown).

When desired, any pair of engines 11—12, 13—14, 15—16 or 17—18, may be cut out of the drive for repairs or for greater economy of operation by merely disconnecting both the pneumatic clutches 90 and 122 in the proper transmission 30, 31, 32 or 33. Similarly, individual engines may be eliminated from the power plant for repair purposes by draining the oil from the hydraulic clutch connecting it with its right angle transmission 30, 31, 32 or 33.

By using only the necessary engines to drive the ship a maximum of economy is effected.

*Operation*

In operation all the clutches 90 and 122 are disengaged by relieving air pressure in the expansible pneumatic members 97 and 125.

The engines 11 to 18, inclusive, may then be started and synchronized as to speed. In order to compensate for small differences in engine speed as well as to compensate for strains in the ship's hull, hydraulic couplings 21 through 28, inclusive, are provided on each of the shafts 11' through 18', respectively.

As the engines operate they rotate their respective shafts 11' to 18' which shafts rotate the gears 49—49 in each of the right angle transmissions 30, 31, 32 and 33, in opposite directions. The two gears 49—49 thus rotating in opposite directions cooperate to rotate both the gears 70 and 71 in opposite directions.

The gears 70 and 71, rotating in opposite directions rotate the hollow shafts 74 and 106 in opposite directions.

When it is desired to turn the shaft 35 to drive the propeller shaft 170 air is supplied under pressure to either the expansible pneumatic element 97 or 125 depending on which direction it is desired to turn the shaft 35.

When air is supplied through the tubes 100—101 to the element 97 the clutch 90 is engaged to connect the shaft 74 with the shaft 35 to drive the latter in one direction, and when air is supplied through the tubes 128—129 to the element 125, the clutch 122 is engaged, connecting the shaft 106 with the shaft 35 to drive the latter in the opposite direction.

The shafts 37 and 38 cooperate to drive the stub shaft 153. It is obvious that the shafts 37 and 38 must rotate in opposite directions to turn the shaft 153.

Similarly, the shafts 34 and 35 must rotate in opposite directions to drive an identical shaft 153.

Between the transmissions 30, 31, 32 and 33 and the transmission 130 there are two flexible couplings 132 and 133. They permit the power to flow freely between the transmissions 30, 31, 32 and 33 and the transmission 130 regardless of strains in the ship.

From the shafts 153 the power is transmitted to the gear 166 through a second pair of flexible couplings 158 and 163 which again provide for the even flow of power despite strains in the hull.

The gear 166 drives the main shaft gear 168 which is keyed to and drives the propeller shaft 170.

The present construction permits the use of multiple engines and the engines due to the extreme flexibility of the drive may be located high in the fantail, thus providing a minimum length of propeller shaft. Since the engines are in the fantail there is a maximum use of hold space for cargo carrying purposes.

It will be understood that the hereinbefore described form of the invention is to be taken merely as a preferred embodiment thereof and that various changes in size, shape and arrangement of parts may be resorted to without departing from the spirit of the invention or the scope of the subjoined claims.

That which is new and is desired to be secured by United States Letters Patent is:

1. A ship drive comprising a propeller shaft, a first gear carried by said propeller shaft, a second gear in engagement with said first gear to drive the latter, a power unit comprising a first pair of horizontally disposed, alined engines, and a second pair of horizontally disposed, alined engines parallel to said first pair, said power unit being spaced vertically above said propeller shaft, a first transmission to receive power from the first pair of engines and transmit the power to a shaft in a vertical plane, a second transmission to receive power from the second pair of engines and transmit the power to a shaft in a vertical plane, and means to transmit the power from said last two named shafts to said second named gear.

2. A ship drive as recited in claim 1 including means in said transmissions to reverse the direction of rotation of the propeller shaft.

3. A ship drive as recited in claim 1 including means in said transmissions to reverse the direction of rotation of the propeller shaft and flexible couplings between the transmissions and the second named gear adapted to transmit power through the shafts in either direction and to compensate for strains in the ship.

4. In a ship drive of the character described, a propeller shaft, a gear mounted on said propeller shaft, a pair of spaced bearings mounted parallel to and adjacent said shaft, a hollow shaft carried by said bearings parallel to said propeller shaft, a gear formed on said hollow shaft intermediate said bearings and adatped to drive said first named gear, a dihedral coupling comprising a female member formed on one end of said hollow shaft and a male member in engagement with the female member, a shaft projecting through said hollow shaft and connected with said male member to drive the latter and means to drive said last named shaft to drive the propeller shaft.

5. A marine propulsion system for a ship having a propeller shaft, said system comprising a speed reduction unit for disposal in the bottom of the ship, said speed reduction unit having a driving pinion and also having a low speed gear driven by said pinion and adapted to be coupled to the propeller shaft for rotation therewith, a set of power units disposed transversely of the ship at a level above said speed reduction unit, and means including a plurality of laterally spaced upright shafts through which said power units are connected in driving relation with said speed reduction unit.

6. A marine propulsion system for a ship having a propeller shaft, said system comprising a speed reduction unit for disposal in the bottom of the ship, said speed reduction unit having a driving pinion and also having a low speed gear driven by said pinion and adapted to be coupled to the propeller shaft for rotation therewith, a set of power units disposed transversely of the ship at a level above said speed reduction unit, and means including a plurality of laterally spaced upright shafts geared to said driving pinion through which said power units are connected in driving relation with said speed reduction unit.

7. A marine propulsion system for a ship having a propeller shaft, said system comprising a speed reduction unit for disposal in the bottom of the ship, said speed reduction unit having a low speed gear adapted to be coupled to the propeller shaft for rotation therewith, a plurality of laterally spaced upright shafts for driving said speed reduction unit, and a plurality of power units connected in driving relation with each of said shafts, said shafts being arranged to permit disposal of said power units transversely of the ship and at a level above said speed reduction unit.

8. A marine propulsion system comprising the combination of a speed reduction unit having a low speed gear adapted to be coupled to a propeller shaft for rotation therewith and also having a plurality of pinions for driving said gear, a plurality of power units, and means including a plurality of shafts geared to each of said pinions at right angles thereto for connecting said power units in driving relation with said speed reduction unit, whereby said power units may be disposed above and transversely of said speed reduction unit.

9. A marine propulsion system comprising the combination of a speed reduction unit having a low speed gear adapted to be coupled to a propeller shaft for rotation therewith and also having a plurality of driving pinions meshing with said gear, a plurality of shafts connected in driving relation with and at right angles to each of said pinions, and a plurality of driving units connectable in driving relation with each of said shafts.

10. A marine propulsion system comprising the combination of a speed reduction unit having a low speed gear adapted to be coupled to a propeller shaft for rotation therewith, and also having a plurality of driving pinions meshing with said gear, a plurality of shafts connected in driving relation with each of said pinions and angularly disposed relative thereto, and a power unit connected in driving relation with each of said shafts.

11. A marine propulsion system as defined in claim 10 having a plurality of power units connected in driving relation with each of said shafts.

References Cited in the file of this patent

UNITED STATES PATENTS

| | | |
|---|---|---|
| 1,513,945 | Vincent | Nov. 4, 1924 |
| 2,235,427 | Harris | Mar. 18, 1941 |
| 2,304,030 | Schmitter | Dec. 1, 1942 |
| 2,368,885 | Schmitter | Feb. 6, 1945 |
| 2,378,589 | Slack | June 19, 1945 |
| 2,513,286 | Cook | July 4, 1950 |
| 2,550,696 | Hiss | May 1, 1951 |

FOREIGN PATENTS

| | | |
|---|---|---|
| 265,092 | Switzerland | Feb. 16, 1950 |
| 331,667 | Germany | Jan. 11, 1921 |
| 361,538 | France | June 8, 1906 |
| 497,824 | Great Britain | Dec. 29, 1938 |